United States Patent [19]

Cameron

[11] Patent Number: 5,317,243
[45] Date of Patent: May 31, 1994

[54] METHOD AND APPARATUS FOR DETECTING VELOCITY PROFILES OF A SPINNING ROTOR OF A POLYPHASE DC MOTOR

[75] Inventor: Scott W. Cameron, Milpitas, Calif.

[73] Assignee: SGS-Thomson Microelectronics, Inc., Carrollton, Tex.

[21] Appl. No.: 923,237

[22] Filed: Jul. 31, 1992

Related U.S. Application Data

[63] Continuation-in-part of Ser. No. 876,871, Apr. 30, 1992, which is a continuation-in-part of Ser. No. 770,576, Oct. 3, 1991.

[51] Int. Cl.$^5$ .............................................. H02P 5/06
[52] U.S. Cl. ...................................... 318/254; 318/439
[58] Field of Search ................ 318/254, 138, 439

[56] References Cited

U.S. PATENT DOCUMENTS

| | | | |
|---|---|---|---|
| 4,415,844 | 11/1983 | Mendenhall et al. | 318/254 |
| 4,532,459 | 7/1985 | Erdman et al. | 318/254 |
| 4,743,815 | 5/1988 | Gee et al. | 318/254 |
| 4,751,414 | 6/1988 | Lewis | 318/439 |
| 4,752,724 | 6/1988 | Rodziwill et al. | 318/254 |
| 4,949,021 | 8/1990 | Rozman | 312/254 |
| 5,023,527 | 6/1991 | Erdman et al. | 318/254 |

Primary Examiner—William M. Shoop, Jr.
Assistant Examiner—David Martin
Attorney, Agent, or Firm—Richard A. Bachand; Lisa K. Jorgenson; Richard K. Robinson

[57] ABSTRACT

A circuit and method for operating a polyphase dc motor of the type having a plurality of driving coils that are commutatively energized in a predetermined sequence to rotate a rotor has a zero crossing detector connected to determine when a back emf of a floating driving coil crosses zero. A generator for generating commutation sequence signals controls which of said driving coils are energized a delayed time after said zero crossing detector detects that a back emf of a floating driving coil has crossed zero. A mask circuit inhibits said zero crossing detector for a delayed time after a commutation change, in dependence upon an acceleration of the rotor. Also, a circuit is provided for adjusting the commutation delay time after a back emf of a floating one of said coils crosses zero, in dependence upon the acceleration of the rotor.

15 Claims, 7 Drawing Sheets

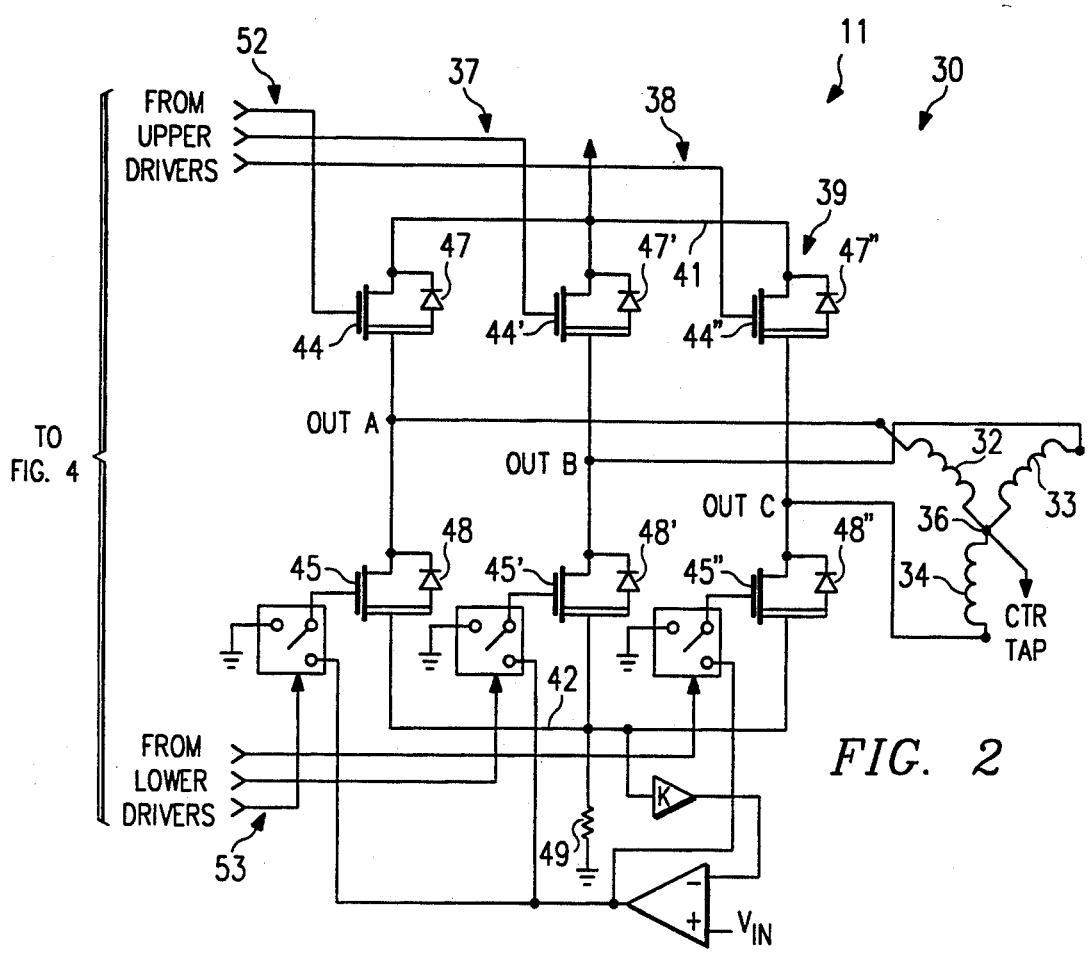
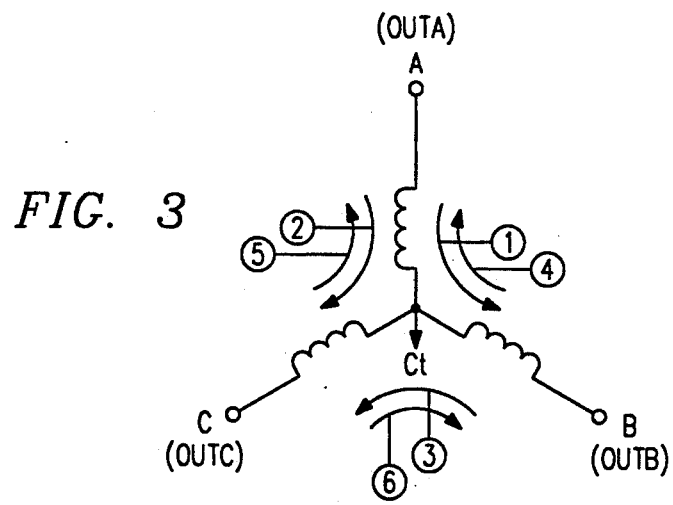
FIG. 2
FIG. 3

METHOD AND APPARATUS FOR DETECTING VELOCITY PROFILES OF A SPINNING ROTOR OF A POLYPHASE DC MOTOR

CROSS-REFERENCE TO RELATED APPLICATIONS

This is a continuation-in-part of my copending patent application Ser. No. 876,871, filed Apr. 30, 1992, which is a continuation-in-part of copending patent application Ser. No. 770,576, filed Oct. 3, 1991, both of said applications being incorporated herein in their entirety by reference.

BACKGROUND OF THE INVENTION

1. Field of the Invention

This invention pertains to improvements in motor driving and controlling circuitry, and more particularly, to an improved circuit and method for detecting acceleration and deceleration rates of a brushless, sensorless, polyphase dc motor, or the like, and for providing profiles of acceleration and deceleration that can be used in the operation of the motor, particularly in determining variable noise masking and commutation delay periods.

2. Description of the Prior Art

Although the present invention pertains to polyphase dc motors, in general, it finds particular application in conjunction with three phase dc motors, particularly of the brushless, sensorless type. Three phase brushless, sensorless dc motors are becoming especially popular, due to their reliability, low weight, and accuracy.

Motors of this type can typically be thought of as having a stator with three coils connected in a "Y" configuration, although actually, a larger number of stator coils are usually employed with multiple motor poles. Typically, in such applications, eight pole motors are used having twelve stator windings and four N-S magnetic sets on the rotor, resulting in four electrical cycles per revolution of the rotor. The stator coils, however, can be analyzed in terms of three "Y" connected coils, connected in three sets of four coils, each physically separated by 90°. In operation, the coils are energized in sequences in each of which a current path is established through two coils of the "Y", with the third coil left floating. The sequences are arranged so that as the current paths are changed, or commutated, one of the coils of the current path is switched to float, and the previously floating coil is switched into the current path. Moreover, the sequence is defined such that when the floating coil is switched into the current path, current will flow in the same direction in the coil which was included in the prior current path. In this manner, six commutation sequences are defined for each electrical cycle in a three phase motor.

In the past, during the operation of a such polyphase dc motor, it has been recognized that maintaining a known position of the rotor is an important concern. There have been various ways by which this was implemented. The most widely used way, for example, was to start the motor in a known position, then develop information related to the instantaneous or current position of the rotor. One source of such instantaneous position information was developed as a part of the commutation process, and involved identifying the floating coil, and monitoring its back emf, that is, the emf induced into the coil as it moves through the magnetic field provided by the stator.

When the voltage of the floating coil crossed zero (referred to in the art as "a zero crossing"), the position of the rotor was assumed to be known. Upon the occurrence of this event, the rotor coil commutation sequence was incremented to the next phase, and the process repeated. The assumption that the zero crossing accurately indicated the rotor position was generally if the motor was functioning properly.

As brushless, sensorless dc motors become more and more in demand, they are being increasingly used in such applications as in disk drives for use in computer applications, such as floppy disk, hard disk, CD ROM, and other similar applications. One of the main advantages provided by such brushless, sensorless motors is the absence of brush elements. This reduces the number of parts in the motor, reduces the mean time between failure of a particular motor, and has no sparking or other undesirable spurious emf generation properties.

However, especially in computer memory drive applications, a widespread problem has been recognized in startup of the disk drive motors. Many relatively sophisticated startup algorithms have been advanced in attempts to solve some of these problems. In motor startup, typically as the motor is being accelerated, commutation and switching noise masks are not employed, primarily due to the dynamically changing period between zero crossings. Due to the changing zero crossing period, attempts to perform masking operations results in oftentimes undesirably masking an actual zero crossing, which interferes with the smooth startup of the motor.

This problem has been addressed typically by employing a minimum or zero masking time after a zero crossing. The result of such zero time mask (or no mask at all) increases in torque ripple and loss of efficiency in the startup.

Another problem that exists is at switchover when operation of the motor is switched from a startup algorithm to a steady-state operation. At such switchovers, typically mechanical jolts are experienced as well as the creation of undesirable noise spikes, since typically the switchover delay is not exactly the same as the optimum commutation delay at steady-state.

In addition, brushless, sensorless motors are finding widespread use in robotics applications. This is due, in part, to the above listed advantages of such motors. It can be seen, furthermore, that the absence of brushes in the motors used in robotics arms, for example, enables their use in hazardous or explosive environments, in contrast to prior art devices.

In any such application, however, many factors exist that may produce an undesirable deceleration of the motor. For example, in the disk drive applications described, motor bearings may seize and cause the motor to decelerate. In disk drives that may be employed, for instance, in lap top computers, a bump or jar to the computer may cause the heads of the disk drive to bind, resulting in an undesired frictional force on the disk and causing an undesirable deceleration of the motor itself.

In robotics applications, a robot arm may encounter an unexpected object or an object in an unexpected place along the path of its travel. This may cause an undesirable deceleration of the motor, and, if no corrective steps are taken, may result in the current within the motor coils increasing to the point of damaging or destroying the motor. Alternatively, the robot arm may damage the object with which it comes in to contact. This is particularly disadvantageous in such applications as automotive assembly, and the like, in which relatively expensive objects may be seriously damaged by unintended contact with the robot arm.

SUMMARY OF THE INVENTION

It is an object of the invention to provide an improved method and apparatus for operating a brushless and sensorless polyphase dc motor.

It is another object of the invention to provide an improved method and apparatus of the type described that takes into account different acceleration rates for the purpose of modifying the masking and delay counters in the creation of commutation signals.

It is another object of the invention to provide a method and apparatus of the type described that enables optimum commutation sequencing to be achieved under conditions of changing velocity.

It is another object of the invention to provide an improved method and circuit of the type described that provides acceleration profiles that can be used in determining variable noise masking and commutation delays.

It is yet another object of the invention to provide an improved circuit and method of the type described that can be employed to increase the startup time of a motor with which the circuitry is employed.

These and other objects, features and advantages of the invention will be apparent to those skilled in the art from the following detailed description of the invention, when read in conjunction with the accompanying drawings and appended claims.

In accordance with a broad aspect of the invention, a circuit for operating a polyphase dc motor is presented. The motor is of a type having a plurality of driving coils that are commutatively energized in a predetermined sequence to rotate a rotor. A zero crossing detector is connected to determine when a back emf of a floating driving coil crosses zero. A generator for generating commutation sequence signals controls which of the driving coils are energized a delayed time after the zero crossing detector detects that a back emf of a floating driving coil has crossed zero. A mask circuit inhibits the zero crossing detector for a delayed time after a commutation change, in dependence upon an acceleration of the rotor. In a preferred embodiment, the mask circuit, includes a period counter, an acceleration counter, and a mask counter, the period counter being an up counter, and the acceleration and mask counters being down counters. A source of clock pulses is connected to clock the period and acceleration counters. A programmable clock pulse divider is connected to receive and programmably divide the clock pulses to provide clock pulses at a selectively divided frequency to the mask counter. Means are operative, when the a zero crossing is detected, to load a count from the period counter into the mask and acceleration counters and then to reset the period counter. An output from the acceleration counter is connected to determine the selectively divided frequency of clock pulses provided by the programmable clock pulse divider to the mask counter. In a preferred embodiment, a memory containing a look-up table is connected to receive an output of the acceleration counter to provide an output to the programmable clock pulse divider in accordance with the output of the acceleration counter.

In accordance with another broad aspect of the invention, a circuit for operating a polyphase dc motor having a plurality of driving coils that are commutatively energized in a predetermined sequence to rotate a rotor has a commutation sequence generator for generating commutation sequence signals for controlling which of the plurality of driving coils are energized a delayed time after a back emf of a floating one of the coils crosses zero. A circuit adjusts the delayed time after a back emf of a floating one of the coils crosses zero, in dependence upon an acceleration of the rotor. In a preferred embodiment, the circuit for adjusting the delayed time induces a period counter, an acceleration counter, and a delay counter, the period counter being an up counter, and the acceleration and delay counters being down counters. A source of clock pulses is connected to clock the period and acceleration counters. A programmable clock pulse divider is connected to receive and divide the clock pulses to provide clock pulses at a selectively divided frequency to the delay counter. A circuit is operative, when the a zero crossing is detected, to load a count from the period counter into the delay and acceleration counters and then to reset the period counter, and an output from the acceleration counter is connected to programmably determine the frequency of clock pulses provided by the programmable clock pulse divider to the delay counter. Again, in a preferred embodiment, a memory containing a look-up table is connected to receive an output of the acceleration counter to provide an output to the programmable clock pulse divider in accordance with the output of the acceleration counter.

In accordance with yet another broad aspect of the invention, a method for operating a polyphase dc motor is presented. The method includes determining an acceleration of a rotor of the motor, and adjusting a commutation delay in response to the determined acceleration. In addition, adjusting a noise mask in response to the determined acceleration may also be included.

BRIEF DESCRIPTION OF THE DRAWINGS

The invention is illustrated in the accompanying drawings, in which:

FIG. 2 is an electrical schematic diagram of the power stage used in the motor driver system of FIG. 1 for providing motor driving signals to the "Y" connected stator coils of the motor with which the driver system might be associated.

FIG. 3 is an electrical schematic diagram of a typical "Y" connected rotor coil arrangement, illustrating the current flow direction for 6 phases of a 3 phase motor.

In the various figures of the drawing, like reference numerals are used to denote like or similar parts.

DETAILED DESCRIPTION OF THE PREFERRED EMBODIMENT

Figure 1:
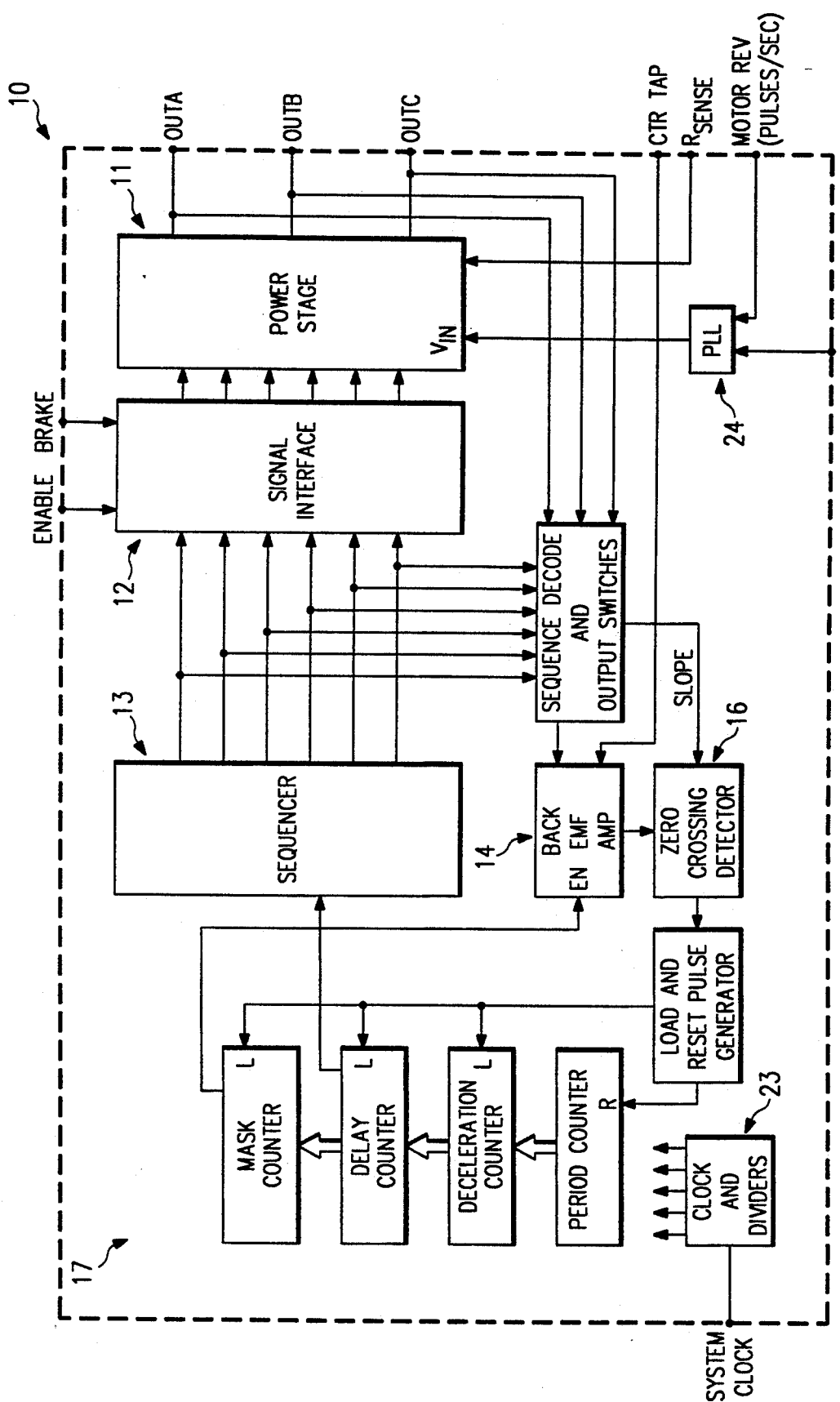
FIG. 1 is an electrical schematic block diagram of a motor driver system incorporating apparatus in accordance with a preferred embodiment of the invention.

A portion of an electrical schematic block diagram of a motor controller 10 in which the apparatus and method in accordance with a preferred embodiment of the invention may be incorporated is shown in FIG. 1. Although the motor controller 10 can be constructed of discrete components, preferably, it is integrated onto a single semiconductor chip adapted for connection to the stator coils of a three phase dc brushless, sensorless, spindle motor, for use, for example, to turn a magnetic or other disk in systems such as computer hard disk drives, cd-rom drives, floppy disk drives, and the like, or in robotics applications, such as to drive various robotics arm or finger parts. Such 3 phase motor preferably has Y connected stator windings, although such Y configured winding connections are not essentially required.

Thus, the windings can be connected to output terminals OUT A, OUT B, OUT C and CTR TAP, as below described in further detail. It should be noted that although a preferred embodiment of the invention is described with regard to a three phase motor, in particular, the principles of the invention can be equally advantageously applied to polyphase motors, in general.

The driving voltage is provided to the output terminals OUT A, OUT B, and OUT C by a power stage 11, which may be configured as described below with reference to FIG. 2. The power stage 11 is commutatively sequenced to provide sequential control output signals to the output terminals OUT A, OUT B, and OUT C by a sequencer circuit 13, described below with reference to FIG. 4. A signal interface circuit 12 supplies the output signals from the sequencer circuit 13 to the power stage 11, as well as enabling other functions, such as brake and output enable functions. The sequencer 13 also provides drive signals to other circuits of the controller circuitry to control the various aspects of rotation of the motor driven by the circuit 10.

The output terminals OUT A, OUT B, and OUT C are switchably connected to a back-emf sense amplifier 14, the details of which are described with reference to FIG. 5 below. The back-emf sense amplifier 14 in turn delivers signals to a zero crossing detector circuit 16, also illustrated in FIG. 5 below, which provides input signals to a digital timing circuit 17, described in detail in FIG. 7 below. The output of the delay counter of the digital timing circuit 17 controls the operation of the sequencer 13, in a manner below described in detail.

The motor controller circuitry 10 includes system clock circuitry 23, and phase lock loop (PLL) frequency/phase detector circuitry 24, and may include various other circuitry, not shown, such as circuitry to support pulse width modulation operation of the motor, "align and go" start up circuitry to facilitate start up of the motor from a stopped condition, port control logic and associated shift register circuitry to facilitate control of the motor controller circuitry by an external microprocessor (not shown), and so forth.

With reference now to FIG. 2, the power stage 11 of the motor control circuitry 10 is a conventional H-bridge 30, commonly referred to as a triple -½- H - bridge. The Y connected stator windings 32, 33, and 34 are shown in FIG. 2 connected to switchably receive the driving current delivered by the power stage 11 of the motor control circuitry 10. Three series current paths 37, 38, and 39 are provided between a supply voltage applied to a line 41, and a reference potential on line 42. Each current path includes, respectively, two switching transistors 44 and 45, 44' and 45', and 44" and 45". The transistors 44, 44', 44", 45, 45' and 45" can be of known power switch FETs, or other switch devices, as desired.

The line 42 is connected to an external sense resistor 49 (externally connected to terminals R SENSE, as shown in FIG. 1), which in turn is connected to ground.

One end of each of the stator coils 32, 33, and 34 is connected together at a common center tap 36, the other ends being connected to respective nodes OUT A, OUT B, and OUT C between the respective pairs of switching transistors 44–45; 44'–45', and 44"–45". Each of the switching transistors 44, 45, 44,' 45', 44", and 45" has a flyback diode 47, 48; 47', 48'; and 47", 48" connected in parallel with its current path, as shown.

In operation, during an energized phase, one node (for example, node OUT A) is driven high by one of the upper switches 44. One node (for example, node OUT B) is driven low by one of the lower switches 45', and the other node (for example, node OUT C) is left floating with both switches 44" and 45" off. This is commonly referred to as the "AB phase". The coils are then switched in a commutation sequence determined by the sequence circuit 13 in a manner such that in each commutation phase current always flows in two of the three coils, with the third coil floating, and that after switching current will continue to flow, and in the same direction, in one of the two coils in which current was flowing in the previous phase.

More particularly, as shown in the diagram of FIG. 3, in a three phase motor, actually six operational phases exist. The current flows in each of these six phases as shown in the following Table A:

TABLE A

| Phase | Current Flows From: | To: | Floating Coil |
|---|---|---|---|
| 1 | A | B | C |
| 2 | A | C | B |
| 3 | B | C | A |
| 4 | B | A | C |
| 5 | C | A | B |
| 6 | C | B | A |

Figure 4:
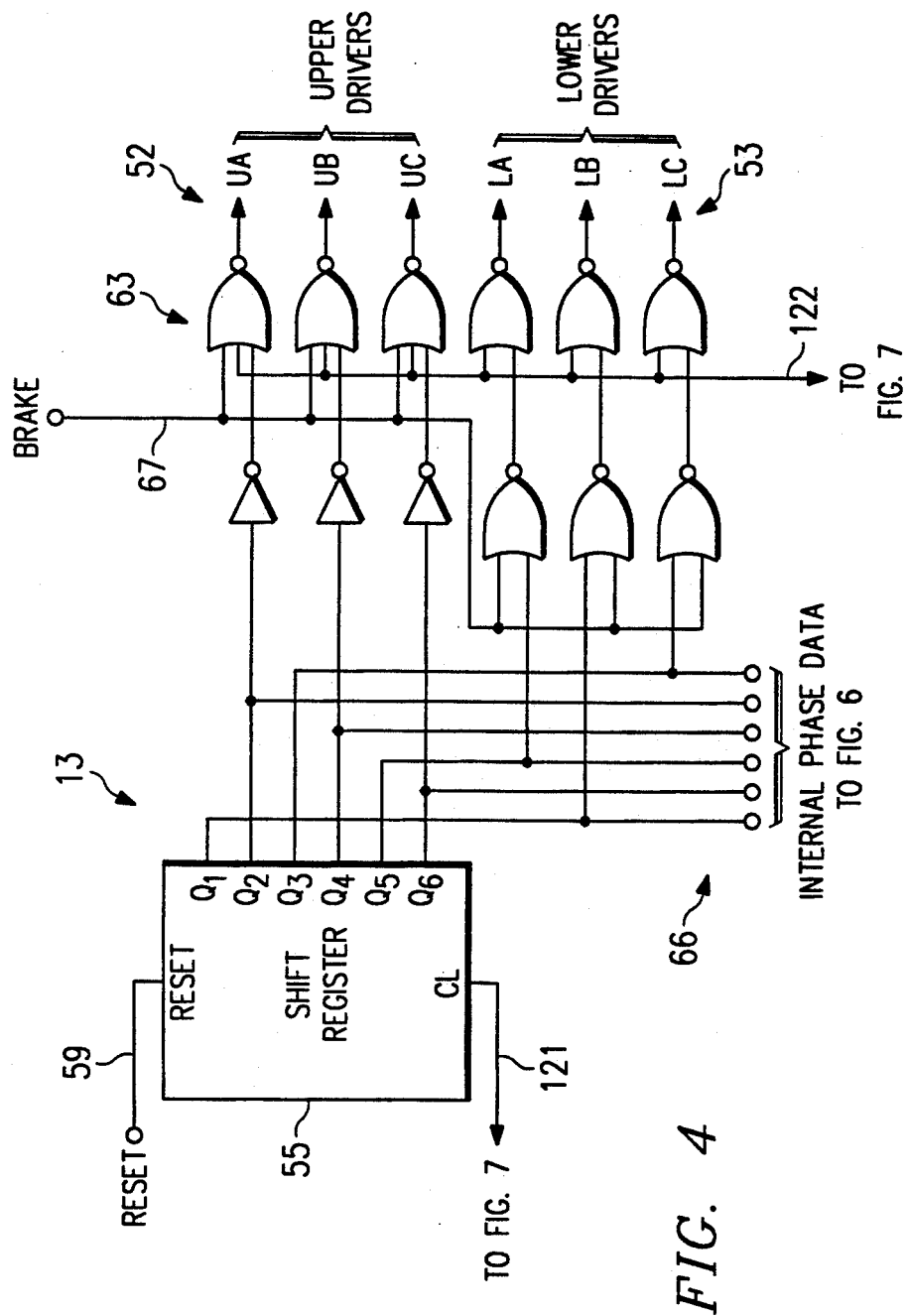
FIG. 4 is an electrical schematic diagram of a sequencer circuit used in the motor driver system of FIG. 1.

The switching of the driver transistors of the power stage 11 to effect the switching currents for each phase is accomplished by a sequencer circuit 13, as shown in FIG. 4. The sequencer circuit 13 provides signals to the upper driver outputs 52 and the lower driver outputs 53 to accomplish the switching sequence outlined above in Table A. The upper and lower driver outputs 52 and 53 are connected to the upper and lower driver input lines, shown in FIG. 2. A shift register 55 determines which of the specific upper and lower output lines which are activated any particular instant. To accomplish this determination, an appropriate sequence may be loaded into the shift register 55, and sequentially shifted through the various data positions of the shift register 55. For example, one data sequence in the embodiment shown which will produce the commutation sequence of Table A might be "110000", which will be continuously clocked to appear at the outputs $Q_1$–$Q_6$.

The shift register 55 is clocked by a system clock, introduced into the shift register 55 by a clock signal produced by a delay counter 112, described in detail below with respect to FIG. 7. Thus, the shift register 55 operates to present a high state on one of its outputs $Q_1$–$Q_6$ to turn on the corresponding upper and lower transistors according to the sequence shown in Table A.

Other circuitry of the sequence circuit 13 includes a reset line 59 to operate to reset the shift register 55. The outputs $Q_1$–$Q_6$ are also connected via lines 66 to the zero voltage crossing logic control circuit of FIG. 6, described below. If desired, a brake and/or over-temperature indicating signals developed elsewhere in the motor control circuit 10 may be applied on line 67 to logic circuit 63 to prevent output to the motor on the upper and lower driver output lines 52 and 53 when such brake signal and/or over-temperature condition exist.

The commutation among the coils 32, 33, and 34 is performed in response to information indicating the specific position of the rotor of the motor in conjunction with circuit information indicating the desired position of the rotor. More specifically, the commutation to apply each successive drive sequence of Table A is determined in response to a corresponding coil reaching a particular rotational position and its correlation with sequencer information indicating where the motor should be when a commutation is to occur. The determination of the precise rotational location of the rotor is continuously being determined by monitoring the zero crossing voltage in each non-driven, or floating, coil. More particularly, as the coils 32, 33, and 34 are switched during the commutation sequence of the rotor, the voltage of the floating coil is monitored by the back emf amplifier circuit 14 shown in FIG. 5.

The back emf amplifier circuit 14 includes switches 81, 82, and 83 respectively connected to the motor driver outputs OUT A, OUT B, and OUT C, in the circuit of FIG. 2 to apply a selected one of outputs OUT A, OUT B, or OUT C to the non-inverting input of a comparator 85. The particular one of the motor driver outputs OUT A, OUT B, or OUT C which is applied to the comparator 85 corresponds to whichever of coils 32, 33, or 34 is expected to be floating (not the coil which is actually floating). Although the term "floating" is used herein to indicate the coil which is not in the instantaneous current path, the coil does not actually "float", but is connected to a tristate impedance. The switches 81, 82, and 83 are operated by the circuit of FIG. 6, below described, to effect the switching of the coil expected to be floating, as just described.

The center tap connection 36 (see FIG. 2) of the rotor is connected to the inverting input of the comparator 85, so that when the voltage on the selected floating coil becomes larger than the center tap voltage, the comparator produces an output, representing the zero or reference voltage crossing of the voltage on the selected floating coil. (The voltage which is applied to the input to the comparator 85 is the so-called "back emf" of the coil, the voltage generated in the selected coil as it moves through the magnetic field within the motor produced by the stator of the motor.) The comparator 85 is designed to have hysteresis, because the occurrence of a voltage beyond the zero crossing voltage may not last a sufficiently long time to enable the output signal of the comparator 85 to be useful.

Figures 5, 5A:
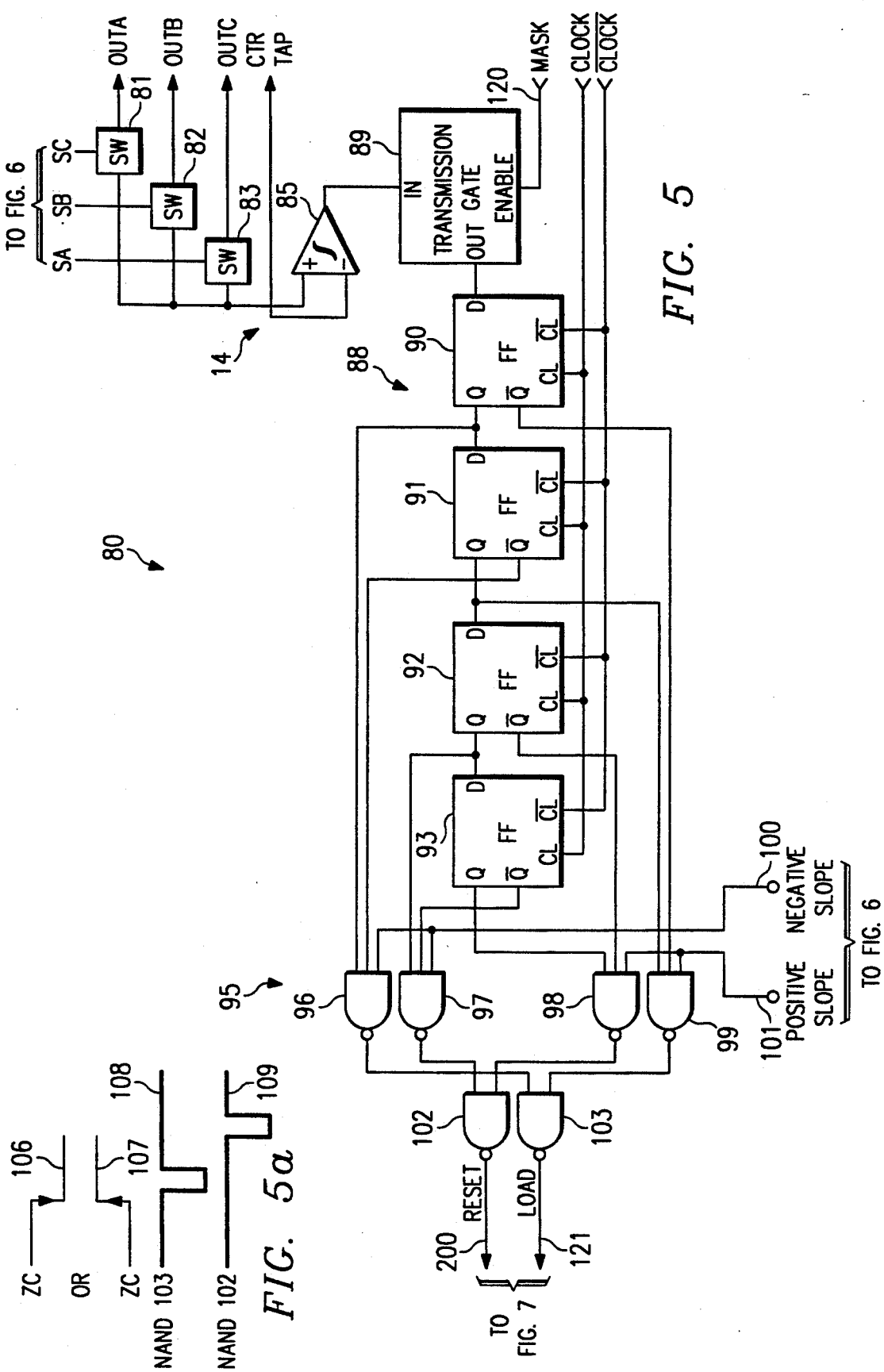
FIG. 5 is an electrical schematic diagram a back emf amplifier and zero crossing detector used in the motor driver system of FIG. 1.
FIG. 5a shows various voltage waveforms generated at the output of the zero crossing detector of FIG. 5, illustrating their timed relationship to a detected rising or falling zero crossing.

With further reference to FIG. 5, the output from the comparator 85 is connected to a shift register 88 through a transmission gate 89. The mask signal generated by the mask counter 111 (see FIG. 7) is applied to an enable input of the transmission gate 89 so that the output from the comparator 85 is inhibited from being applied to the shift register 88 during the mask period following a phase commutation of the sequencer circuit 13. When, however, the output signal from the comparator 85 is enabled to pass the transmission gate 89, it is applied to the D input of the first of four D-type flip flops 90, 91, 92, and 93 comprising the shift register 88.

The various outputs of the flip flops 90, 91, 92, and 93 are connected to the output logic circuit 95, which includes NAND gates 96, 97, 98, and 99. Each of the flip flops 90, 91, 92, and 93 receive a clock input, for example from the system clock, and each produces an inverted (Q(bar)) and non-inverted (Q) output. The Q outputs of flip flops 90, 91, and 92 are applied to the D input of the respective next stage flip flops, and the Q output of the last stage flip flop 93, is connected to NAND gate 98 of the output logic circuit 95.

The Q outputs of the flip flops 90 and 92 are connected to inputs of the upper NAND gates 96 and 97, respectively, while the Q outputs of the flip flops 91 and 93 are connected to the inputs of the lower NAND gates 99 and 98, respectively. On the other hand, the Q(bar) outputs of flip flops 90 and 92 are connected to inputs of the lower NAND gates 99 and 98, respectively, while the Q(bar) outputs of flip flops 91 and 93 are connected to inputs of the upper NAND gates 96 and 97, respectively.

Also, expected slope line 100 corresponding to an expected negative-to-positive going zero crossing slope is connected to inputs of NAND gates 96 and 97, and expected slope line 101 corresponding to an expected positive-to-negative going zero crossing slope is connected to inputs of NAND gates 98 and 99. The signals on lines 100 and 101 which indicate the direction of the expected zero crossing are generated from the phase information developed in the circuit of FIG. 6, which in turn, is derived from the outputs of the shift register 55 in the sequencer circuit of FIG. 4.

Finally, the outputs from the logic circuit 95 are connected to the output NAND gates 102 and 103, the Outputs of which being produced in response to the detection of an actual zero crossing of a specified floating coil, the zero crossing having a transition in a specified, expected direction, ie, either a negative-to-positive going zero crossing transition or a positive-to-negative going zero crossing transition.

The connections to the output NAND gates 102 and 103 are established with the output of the upper NAND gate 96 and the lower NAND gate 99 connected to the inputs of the output NAND gate 103, and the output of the upper NAND gate 97 and the output of the lower NAND gate 98 connected to the inputs of the output NAND gate 102. The line 101 on which a signal would appear if a positive slope zero crossing is expected is connected to the inputs of the upper NAND gates 96 and 97, and the line 100 on which a signal would appear if a negative slope zero crossing is expected is connected to the inputs of the lower NAND gates 98 and 99. Thus, the upper NAND gates 96 and 97 are responsive the actual occurrence of an expected positive slope zero crossing and the lower NAND gates 98 and 99 are responsive to the actual occurrence of an expected negative slope zero crossing.

Because of the staged connections at the four stage shift register 88 for each of the positive and negative detection paths, the outputs from the output NAND gates 102 and 103 are two non-overlapping pulses, spaced in time, as shown in FIG. 5a by the curves 109 and 108, respectively, resulting from either a positive-to-negative zero crossing 106 or a negative-to-positive zero crossing 107. Thus, the pulse generated at the output of NAND gate 103 precedes the pulse generated at the output of NAND gate 102 by one clock cycle. The output of the NAND gate 103 is used to provide a "load" signal to the counters which measure the required mask and delay time after a phase commutation as well as the deceleration counter to determine the deceleration rate. The output of the NAND gate 102 is used to provide a "reset" signal to the period counter, as below described.

Figure 6:
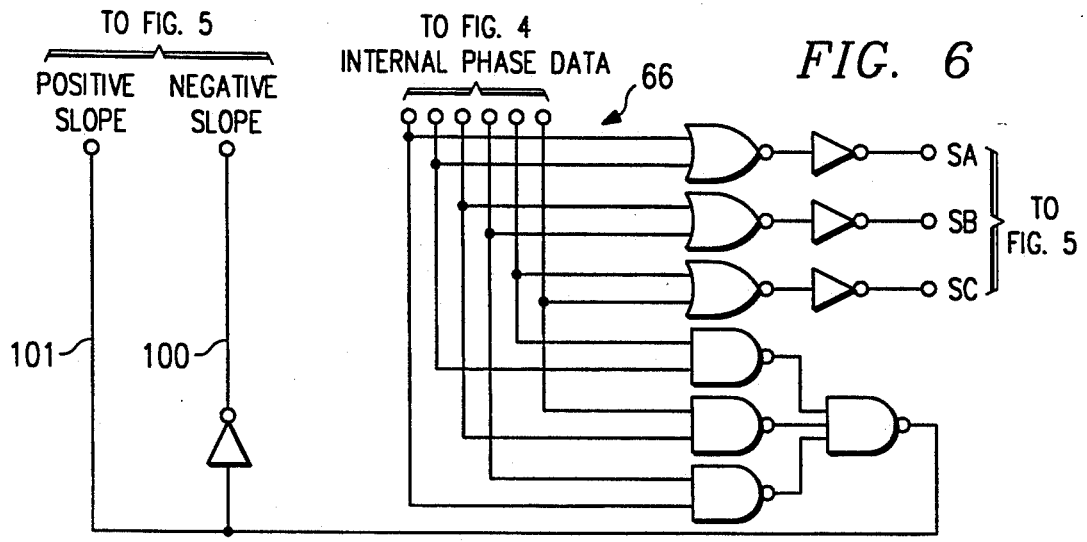
FIG. 6 is an electrical schematic diagram of a zero crossing logic switching circuit used to control the back emf amplifier connections in the circuit of FIG. 5.

The circuit for developing the switching signals for the switches 81, 82, and 83, as well as the negative and positive slope indicating signals on lines 100 and 101 is shown in FIG. 6, to which reference is now made. The circuit of FIG. 6 derives internal phase data on lines 66 from the output from the sequencer shift register 55 in FIG. 4. The lines 66 contain information respectively, from left to right indicating signals to upper and lower A, upper and lower B, and upper and lower C drive transistors (see FIG. 2). Thus, the output signal SA indicates that the coil at OUT A is expected to be floating, SB indicates the coil at OUT B is expected to be floating, and the output signal SC indicates the coil at OUT C is expected to be floating. The signals on lines 101 and 100 likewise, indicate whether the floating coil (that is, whichever may be instantaneously floating) is expected to experience a back emf zero crossing from the negative or positive direction.

In order to assist the back emf amplifier 14 and logic circuit 95 properly detect the zero crossing of the selected floating coil, it has been found necessary to mask noise generated in the operation of various circuit elements, especially noise generated by the commutation of the coils, which tend to ring, for some time after switching, and noise generated in the sequencer circuit. To accomplish this masking function, as well as acceleration rate detection (including deceleration rate detection, represented by negative acceleration), variable delay, and other circuit functions enabled by the method of operation of the circuit of the invention, the timing circuitry 105 of FIG. 7 is provided. The timing circuitry 105 has an up counter 110, and three down counters 111, 112, and 113. The up counter 110 serves as a period counter to provide a digital count on its output corresponding to the time between actual zero crossings of the selected floating coil, detected by the zero crossing circuitry described above with reference to FIG. 5.

The up counter 110 receives a clock signal input on line 202 from a clock frequency divider 120, which divides the system clock frequency on line 201 to a desired frequency. The frequency selected determines the resolution of the system. The up counter 110 is reset by the reset pulse produced by the NAND gate 102 in the circuit of FIG. 5, after the actual occurrence of a desired zero crossing has been detected. Accordingly, the up counter 110 starts to count after being reset, and continues the count until being again reset upon the detection of the next actual zero crossing. The period counter 110 is of N bits, to produce an output on output bus 204, depending upon the count reached by the period counter 110, the output bits being denoted "N . . . O".

The output of the up counter 110 on bus 204 is connected to the inputs of each of the down counters 111, 112, and 113, which serve mask, delay, and acceleration rate detection functions. The down counter 111 is a counter connected to receive bits N . . . 2 on the bus 204 from the period counter 110. Since the two least significant bits of the output from the period counter 110 are not connected to the mask counter 111, the mask counter 111 has a divide by four counter operation with respect to the count on the bus 204. The down counter 111 determines a variable mask which serves to mask the noise of the sequencer circuit 13, shown in FIG. 4, as well as the noise produced by the coils 32, 33, and 34 in response to being commutated, to produce an output on line 120 when the desired mask count has been reached. The down counter 111 is hereafter referred to as the mask counter 111. The mask counter output signal on the line 120, for example, can be used to enable the transmission gate 89 in the zero crossing detector in FIG. 5, so that no zero crossing can be detected until after the expiration of the mask period. The mask counter 111 receives a "LOAD" signal from line 121, the "LOAD" signal being produced by the output of the NAND gate 103, shown in FIG. 5, just prior to the occurrence of the RESET pulse upon the output of the NAND gate 102.

Also, the mask counter 111 receives a clock signal from a programmable frequency divider 123. The divisor selected within the programmable divider 123 is determined by the output from the look-up table 231 that is developed in response to the count of the period counter 110 and the output from the acceleration counter 113, below described in detail.

Thus, in operation, when an actual zero crossing of a selected floating coil is detected by the circuitry of FIG. 5, the count which exists in the up counter 110 is loaded into the mask counter 111. The up counter 110 is reset to begin a new period count that will continue until the occurrence of the next zero crossing, at which time, the new count will be loaded into the mask counter 111, the up counter 110 reset, and the process repeated.

In a similar fashion, the down counter 112 serves to count a time corresponding to a delay after the detection of a zero crossing before the coils are switched or commutated to the next phase. The down counter 112 is referred to hereafter as the delay counter 112. The delay counter 112 receives the bits on bus 204 from N to 1, the least significant bit being omitted to provide a divide by two function of the delay counter 112 with respect to the number delivered on bus 204. The delay counter 112 receives a divided clock frequency from a frequency divider 126, the divisor of which is selected by another output from the look-up table 23 to enable a variable delay to be accomplished in accordance with the acceleration of the rotor determined by the acceleration counter 113, as below described in detail. The operation of the load and count functions are essentially the same as the operation of the mask counter 111 above described. However, it is noted that the time calculated by the delay counter 112 indicated by the output on line 122 may be substantially longer than the time calculated by the mask counter 111.

The inverted output of the delay counter 112 on the line 122 is applied to the clock input of the mask counter 111 by a NAND gate 141 to which the clock pulses from the frequency divider 123 are also applied. Thus, the signal on the line 122 inhibits the application of the clock pulses to the mask counter 111 until after the completion of the delay count by the delay counter 112. The counts of the mask counter 111 and the delay counter 112 are therefore sequential, with the mask count of the mask counter 111 following the completion of the delay count of the delay counter 112.

Figure 7:
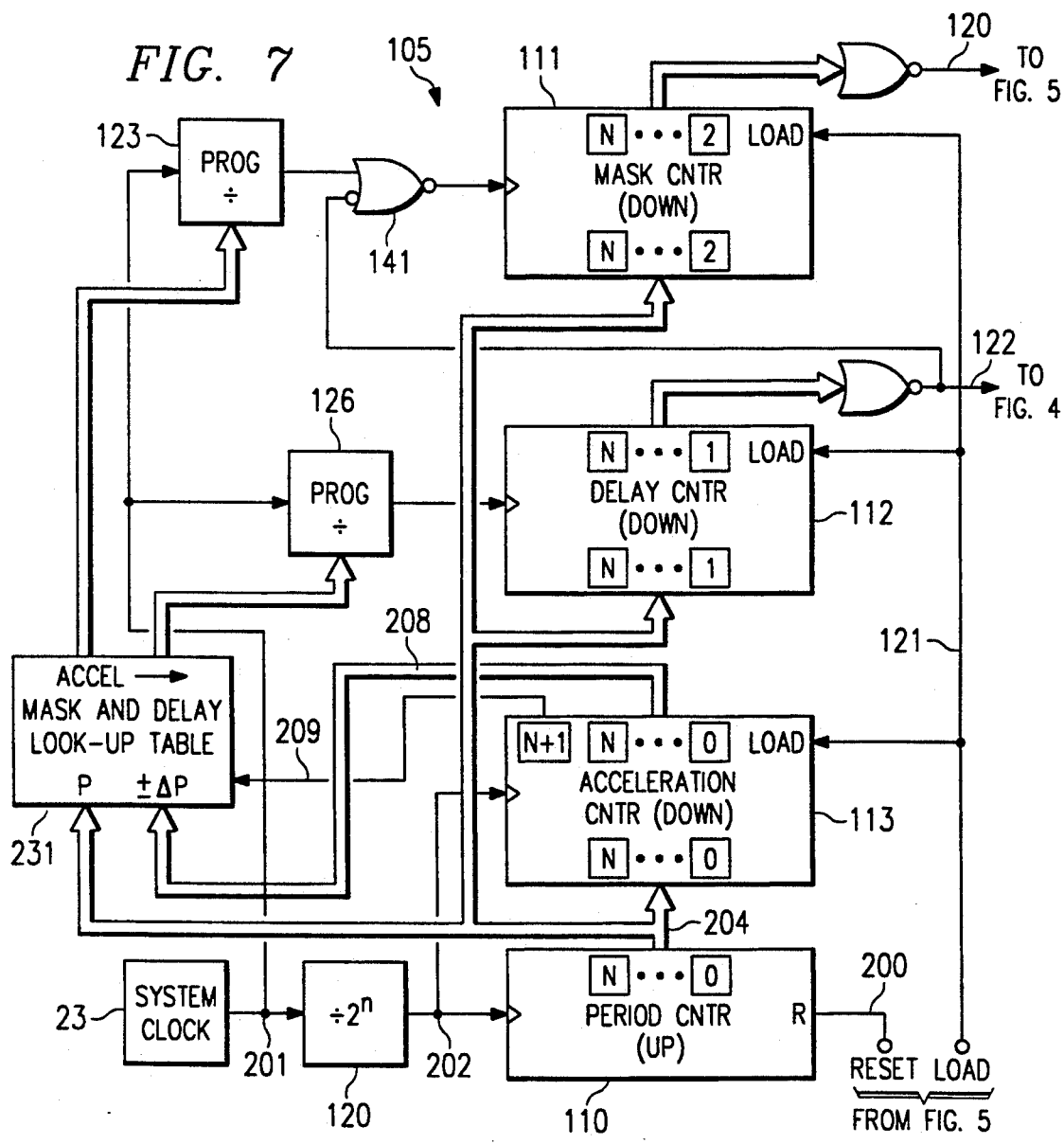
FIG. 7 is an electrical schematic diagram of a circuit for generating a commutation delay and sequencer advance signals, a commutation noise mask generator, and a deceleration counter for use in the motor driver system of FIG. 1.

Because the timing circuitry 105 of FIG. 7 operates on the actual, not expected, zero crossing signals of the floating rotor coils, it enables many motor control functions which have been heretofore not possible to achieve. For example, the rotor commutation can be based upon a delay calculated after an actual zero crossing of an anticipated floating coil occurs. Thus, for example, the output of the delay counter 112 on the output line 122 is used to initiate a coil commutation. Then, since the mask counter 111 is also dependent upon the delay counter output signal to begin its count, the switching noise from the sequencer circuit 13 and switching transients produced by the coils can be masked, so that spurious zero crossings caused by switching noise will not be interpreted as an actual zero crossing of the selected floating coil.

In addition, the acceleration rate of the motor can be detected, and if desired, compared with a particular profile or threshold to control the operation of the motor, virtually under any operating condition. For example, the acceleration rate of the motor can be taken into account during startup of the motor to provide a variable commutation delay in accordance with the acceleration rate, and to provide a variable noise mask at such rate. It should be noted that although the term "acceleration rate" is used herein, the term acceleration is used broadly wherein negative acceleration represents a deceleration rate.

To accomplish this function, an additional down counter 113 mentioned is provided. The down counter 113 is referred to hereafter as the acceleration counter 113. The acceleration counter 113 has bits O through N, to receive the output bits O through N on line 204 from the period counter 110. The outputs from the acceleration counter 113 are derived on a bus 208 and a line 209 connected to the look-up table 231. The bus 208 receives the first N bits, constituting O through N bits, and the carry bit, denoted N+1 represents the direction of the acceleration. Since the clock frequency applied to the period counter 110 and the acceleration counter 113 is of the same frequency, if the carry bit N+1 changes state, the signal on line 209 indicates that the count previously loaded into the acceleration counter 113 from the period counter 110 has been counted down and beyond. This represents a deceleration of the motor, since the time between successive zero crossings is increasing.

The bus 208 and carry line 209 constitute acceleration counter inputs to the look-up table 231. An additional input to the look-up table 231 is provided by the data on bus 204 from the period counter 110. The outputs from the look-up table 231, as described briefly above, provide the indications to the programmable divider circuits 123 and 126 to determine the amount by which the system clock pulses on line 201 are divided for application to the respective mask counter 111 and delay counter 112.

The look-up table 231 can be constructed of a content addressable memory or other device known in the art, and can contain a table of desired numbers for application to the programmable dividers 123 and 126 to program the respective programmable dividers 123 and 126 in dependence upon the speed of the motor, as indicated by the number delivered upon the bus 204 from the period counter 110 and by the change in speed as determined by the numbers developed on the output bus 208 and direction signal on line 209 from the acceleration counter 113. The precise value is delivered at the output of the look-up table 231, as will be apparent to those skilled in the art, can be determined for the particular motor and application with which the circuit is to be employed.

Figure 8:
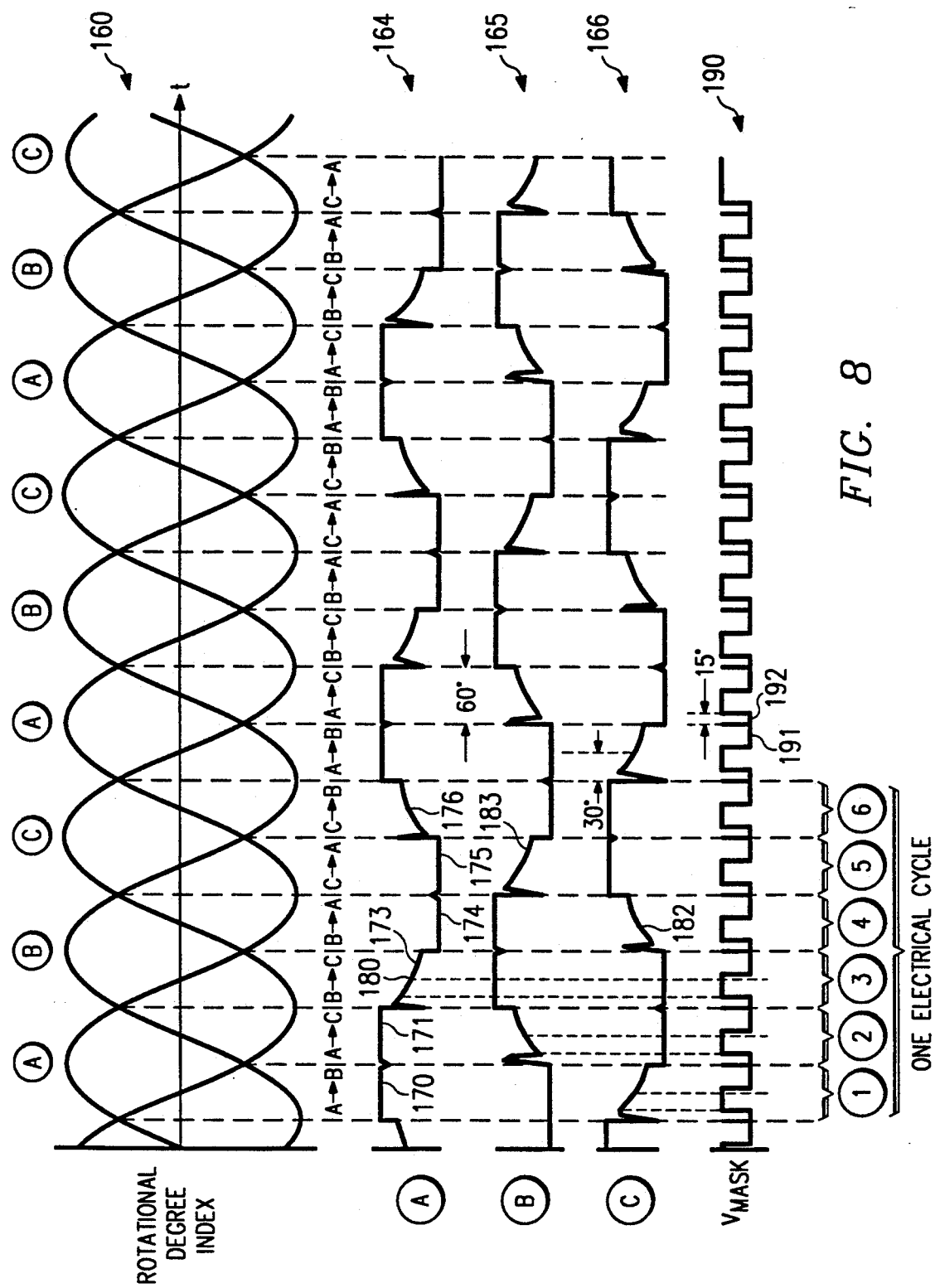
FIG. 8 are electrical waveforms showing the voltage signals at various points in the circuit of FIG. 1 with respect to several electrical cycles of the motor with which the driver circuit may be associated.

The operation of the circuit 10 will now be described, with reference to the waveforms which are developed in the various parts of the circuit, as shown in FIG. 8. The rotational degree index curves 160 for each coil are shown across the top of the waveforms for reference. Each sinusoidal waveform is labeled to correspond to the node to which each of the coils is connected: coil 32 - A, coil 33 - B, and coil 34 - C. Beneath the rotational degree curves 160 is the corresponding commutation sequence which occurs at the specified rotational position.

The next three curves 164, 165, and 166 show the voltages of the respective driven coils A, B, and C. It can be seen that for one electrical cycle, indicated at the bottom of the curves of FIG. 8, each coil will have two sequences in which it has positive voltage, two sequences in which it has negative voltage, and two sequences during which it floats. For example, referring to the curves representing the voltage on coil A, the first two voltages 170 and 171 of sequences 1 and 2 during which current flows respectively from coil A to coil B, and from coil A to coil C, are positive. During the time coil A floats in sequence 3 the voltage 173 changes from positive to negative. The next two voltages 174 and 175 of sequences 4 and 5 during which current flows respectively from coil B to coil A, and from coil C to coil A, are negative. Finally, when coil A again floats during sequence 6, the voltage 176 changes from negative to positive. The other coils B and C have similar voltage curves, each displaced 120° from each other.

It can be seen that each coil floats twice during one electrical cycle, and has two zero crossings; however, one zero crossing has a negative slope, from positive to negative, and the other has a positive slope, from negative to positive. Thus, an ambiguity would exist if the rotor position were to be determined solely on the basis of a zero crossing without regard to the direction of the crossing. (This was one of the shortcomings of previous motor driver systems.) Thus, when the voltage, for example, of coil A transitions from positive to negative, shown by curve 173, a zero crossing 180 is detected by the zero crossing circuit 80, shown in FIG. 5. Moreover, the direction of the crossing also is detected by the slope detecting circuitry 95, also shown in FIG. 5. Once the zero crossing has been detected, the sequences is incremented, commutating the coils, the timing circuit 105 of FIG. 7 is reset and reloaded, as above described. The zero crossing detector then begins to look for the zero crossing of the next floating coil; in this case of coil C, which will be transitioning from negative to positive, as can be seen from the curve 182 in FIG. 8. After its zero crossing is detected and commutation performed, the positive to negative zero crossing of floating coil B, shown by the curve 183 is sought, and so forth.

In summary, the commutation sequence is as follows: the sequencer circuit establishes a desired rotor phase, and the zero crossing detector detects the occurrence by finding the proper zero crossing. When the zero crossing is detected, first a delay mask is generated by the delay counter 112, then the rotor coils are commutated, and a second mask is generated by the mask counter 111. The correct floating coil is determined by the phase information being generated from the output signals of the shift register 55, and the phase information connects the proper coil to the back emf amplifier 85 by closing the proper switch 81, 82, or 83.

By creating the delay between the zero crossing and incrementing to the next phase, the torque ripple can be optimized, thereby taking advantage of the inertia of the rotor.

It can be seen that throughout the process, two key elements exist: 1) the anticipated zero crossing is first established and 2) the actual zero crossing detected which corresponds to the previously established anticipated zero crossing. If the actual zero crossing is not detected, no commutation occurs until the zero crossing is in fact detected. Thus, the sequencer 13 is always synchronized to the actual motor position, even if the drive signals to the motor are removed.

Finally, the mask signal 190 which would be produced on the line 120 of the mask circuit of FIG. 7 in normal operation (i.e., at steady-state operating conditions with no acceleration) is shown in the bottom curves of FIG. 8. The mask curve has two portions, for example 191 and 192, corresponding to the mask times of the delay counter 112 and the mask counter 111, respectively.

With reference again to FIG. 7, the timing circuitry 105 incorporates an acceleration rate detection circuitry, according to the invention. The operation of the acceleration rate detection circuitry is as follows with additional reference now to the timing diagram of FIG. 9. The reset signal on the line 200 generated by the circuit of FIG. 5 in response to a zero crossing resets the period counter 110 to all "zeros."

Clock pulses from the system clock 23 (see FIG. 1) on the line 201 are applied to the frequency divider 120 for delivery on the line 202 to clock the period counter 110 up and the acceleration counter 1134 down. The frequency of the clock pulses on the line 202 from the frequency divider 120 is $f_{clk}$, having a period, $\tau_{clk}$. After the reset signal resets the period counter 110 to all zeros at a beginning time beginning at the first zero crossing, ZC(1), 300, the count of the period counter 110 increases in a stairstep manner as shown by the curve 301. Every binary count of the period counter corresponds to one period of the clock frequency. Thus, at any interval of time, the binary bus 204 will contain a series of bits, which, when multiplied by the period of the clock, $\tau_{clk}$, represents the total time duration between the last reset of the period counter 110 and the time when the binary number on the bus 13 is observed.

The output from the period counter 110 delivered on the bus 204 is applied to the acceleration counter 113. The acceleration down counter 113 receives clock pulses on the line 202 from the system clock divider 23 appearing on line 201. Additionally, the acceleration counter 113 has a "load" terminal that receives from line 121 load pulses that are derived in a response to a zero crossing by the circuit shown in FIG. 5 just prior to the reset pulse on the line 200 to the period counter 110. The load and reset pulse relationship is shown by the graphs at the bottom of FIG. 9, and shown in FIG. 5a.

Figure 9:
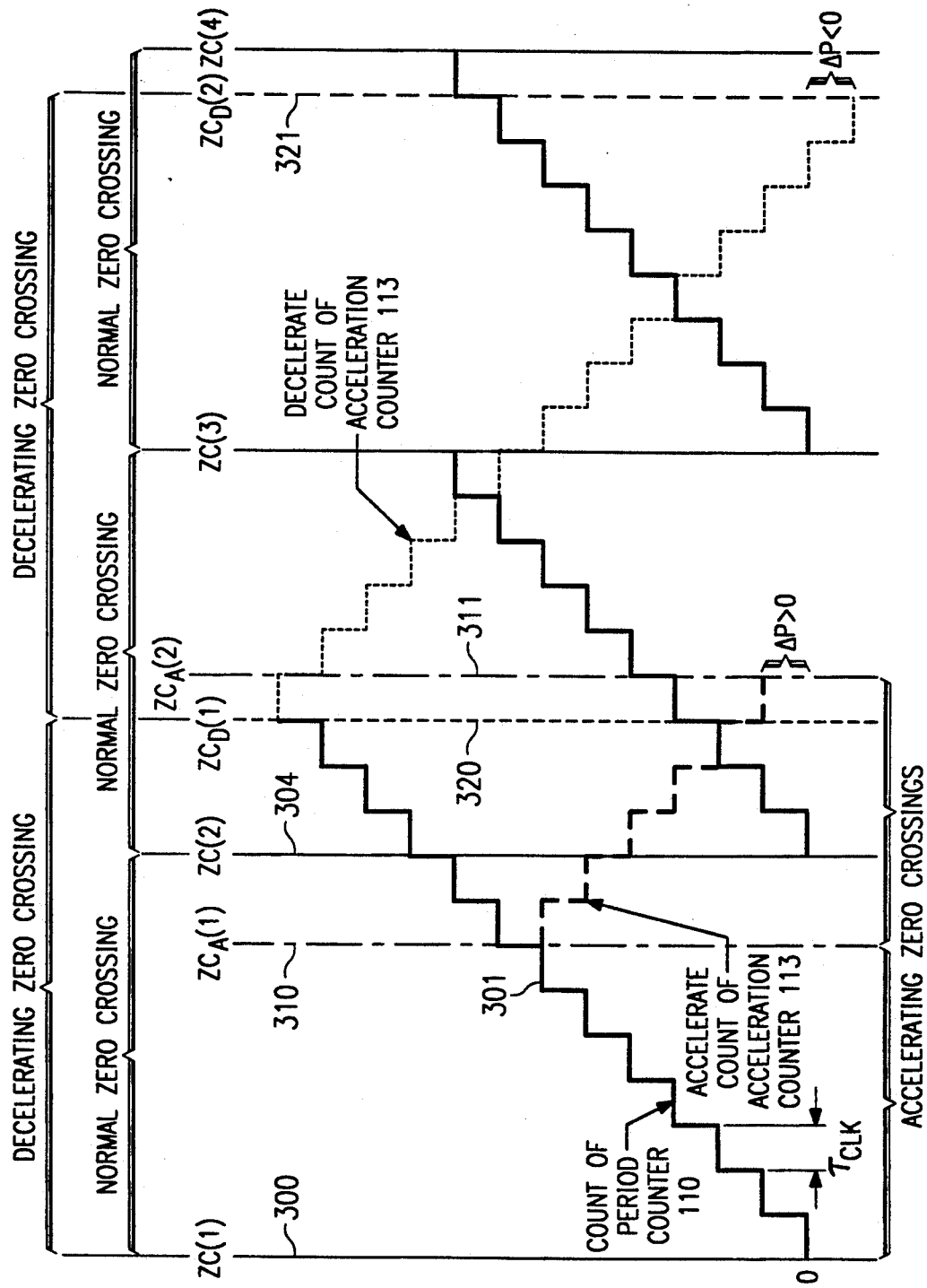
FIG. 9 shows various waveforms illustrating the operation of the period, acceleration, commutation delay, and mask counters in accordance with the operation of the circuit of the invention.

The operation of the circuit is explained using the wave forms shown in FIG. 9. A first zero crossing, ZC(1), is represented by a vertical line 300. The zero crossing ZC(1) relates to the position of the rotor of the motor with which the circuit is associated, as described above. When the zero crossing ZC(1) occurs, a "load" pulse and "reset" pulse are generated by the circuit of FIG. 5. The reset pulse resets the period counter 110 to all zeros.

Initially, the contents of the period counter are not of concern. From this point, the period counter 110 is reset to count upward, shown by the stair-step line 301. At the next zero crossing 304, ZC(2), the period counter 110 reaches a certain count. This count multiplied by the period $\tau_{clk}$ of clock of the clock frequency, equals the actual time taken for the period counter 100 to count to the next occurring zero crossing 304, ZC(2).

The count in the period counter 110 that exists upon the occurrence of the second zero crossing 304, ZC(2), represents the time from the first zero crossing 300, ZC(1). This count is loaded into the acceleration counter 113 upon the occurrence of the load pulse. Immediately after that, the count within the period counter 110 is again reset to all zeros upon the occurrence of the reset pulse in preparation of the next zero crossing measurement. The period counter 110 then begins its upward count again, as illustrated by the stair step line 226. On the other hand, the acceleration counter 113 begins a downward count. The process is continued in normal operation for counts ZC(3), ZC(4), and so on.

If the time between successive zero crossings ZC(1) and ZC(2) increases, as illustrated by dash-dot lines 310 and 311, the count contained within the acceleration counter 113 will not reach zero, the count previously reached by the period counter 110 between ZC(1) and $ZC_A(1)$. Thus at the second accelerating zero crossing $ZC_A(2)$ on line 11, a positive number will be delivered on the output bus 208, the positive sign being indicated by the state of the signal on the line 209. Thus, the combination of the period and the change of period that is inputed to the look-up table 231 selects desired mask and delay counter clock rates for the particular acceleration measured.

On the other hand, if the count in the acceleration counter 113 had not reached zero, because the rotor was decelerating, the subsequent zero crossings $ZC_D(1)$ denoted by dash line 320 and $ZC_D(2)$ denoted by dash line 321 results in the count of the acceleration counter 13 counting below zero, as shown. Again, the period and the negative count from the acceleration counter 113 applied by the bus 208 and the direction indicating signal on line 209 are applied to the look-up table 231 to select appropriate mask and delay counter clock rates for a decelerating rotor condition.

It should be appreciated that the measurement of the acceleration rate is essentially independent of the particular speed of the motor. This is because at each zero crossing a new count is loaded into the acceleration counter 113, representing the time between the preceding and next preceding zero crossings. Thus, the technique according to the invention is independent of the speed at which the motor may be operating. Furthermore, it will be appreciated that the operation of the circuit can be essentially continuously variable in the adjustment of the mask and delay counter functions, regardless of the speed of the motor. Thus, the mask and delay counters can be precisely controlled from zero velocity through startup, within normal operating range, and beyond. The ability to provide a continuously variable commutation delay and noise masking enables the motor to be brought up to speed rapidly, with no switchover perturbations that existed in prior circuits when switching from a startup mode of operation to normal speed operation.

Although the invention has been described and illustrated with a certain degree of particularity, it is understood that the present disclosure has been made by way of example only, and that numerous changes in the combination and arrangements of parts and features can be made by those skilled in the art without departing from the spirit and scope of the invention, as hereinafter claimed.

I claim:

1. A circuit for operating a polyphase dc motor having a plurality of driving coils that are commutatively energized in a predetermined sequence to rotate a rotor, comprising:
   a zero crossing detector connected to determine when a back emf of a floating driving coil crosses zero;
   a generator for generating commutation sequence signals for controlling which of said driving coils are energized a delayed time after said zero crossing detector detects that a back emf of a floating driving coil has crossed zero;
   and mask circuit for inhibiting said zero crossing detector for a delayed time after a commutation change, in dependence upon an acceleration of the rotor, comprising:
   a period counter, an acceleration counter, and a mask counter, said period counter being an up counter, and said acceleration and mask counters being down counters;
   a source of clock pulses connected to clock said period and acceleration counters;
   a programmable clock pulse divider connected to receive and programmably divide said clock pulses to provide clock pulses at a selectively divided frequency to said mask counter;
   means operative when said zero crossing is detected to load a count from said period counter into said mask and acceleration counters and then to reset said period counter; and
   an output from said acceleration counter being connected to determine the selectively divided frequency of clock pulses provided by said programmable clock pulse divider to said mask counter.

2. The circuit of claim 1 further comprising a memory containing a look-up table connected to receive an output of said acceleration counter to provide an output to said programmable clock pulse divider in accordance with said output of said acceleration counter.

3. A circuit for operating a polyphase dc motor having a plurality of driving coils that are commutatively energized in a predetermined sequence to rotate a rotor, comprising:
   a commutation sequence generator for generating commutation sequence signals for controlling which of said plurality of driving coils are energized a delayed time after a back emf of a floating one of said coils crosses zero;
   a period counter, an acceleration counter, and a delay counter, said period counter being an up counter, and said acceleration and delay counters being down counters;
   a source of clock pulses connected to clock said period and acceleration counters;
   a programmable clock pulse divider connected to receive and divide said clock pulses to provide clock pulses at a selectively divided frequency to said delay counter;
   and a circuit operative when said zero crossing is detected to load a count from said period counter into said delay and acceleration counters and then to reset said period counter;
   an output from said acceleration counter being connected to programmably determine the frequency of clock pulses provided by said programmable clock pulse divider to said delay counter.

4. The circuit of claim 3 further comprising a look-up table connected to receive an output of aid acceleration counter to provide an output to said programmable clock pulse divider in accordance with said output of said acceleration counter.

5. A circuit for operating a polyphase dc motor having a plurality of driving coils that are commutatively energized in a predetermined sequence to produce rotation of a rotor, comprising:
   a commutation sequence generator for generating commutation sequence signals for controlling which of said plurality of driving coils are energized;
   circuitry for receiving a back emf of at least one of said driving coils when said at least one of said driving coils is in a floating state;
   rotor position determining circuitry for determining when the back emf received by said circuitry for receiving the back emf crosses a reference voltage;
   commutation delay circuitry for determining a delay after an occurrence of the back emf crossing the reference voltage, for initiating a next commutation sequence;
   a circuit for measuring times between successive occurrences of the back emf crossing the reference voltage, whereby a change in time between successive occurrences of the back emf crossing indicates an acceleration of the rotor;
   a circuit connected to adjust the delay of said commutation delay circuit in response to the circuit for measuring times between successive occurrences of the back emf crossing the reference voltage indicating an acceleration of the rotor; wherein said circuit connected to adjust the delay of said commutation delay circuit, comprises:
   an up counter and first and second down counters;
   a source of clock pulses connected to clock said up and said second down counters;
   a first programmable clock pulse divider connected to receive and programmably divide said clock pulses to provide clock pulses at a selectively divided frequency to said first down counter;
   means operative when said reference voltage crossing detector detects a reference voltage crossing to load a count from said up counter into said first and second down counters and then to reset said up counter;

an output from said second down counter being connected to programmably determine the frequency of clock pulses provided by said first programmable clock pulse divider;

whereby said first counter determines a commutation switching time of said commutation sequence and said second counter determines a acceleration of said rotor.

6. The circuit of claim 5 further comprising mask circuitry for inhibiting said circuitry for determining when the back emf received by said circuitry for receiving the back emf crosses a reference voltage for a predetermined time after a change in said commutation sequence.

7. The circuit of claim 6 further comprising a circuit connected to adjust the length during which said back emf determination is inhibited after a reference voltage crossing, in response to the circuit for measuring times between successive occurrences of the back emf crossing the reference voltage indicating an acceleration of the rotor.

8. The circuit claim 7 wherein said circuit connected to adjust the length during which said back emf determination is inhibited after a reference voltage crossing, comprises:

an up counter and third and second down counters;

a source of clock pulses connected to click said up and said second down counters;

a second programmable clock pulse divider connected to receive and programmably divide said clock pulses to provide clock pulses at a selectively divided frequency to said third down counter;

means operative when said reference voltage crossing detector detects a reference voltage crossing to load a count from said up counter into said third and second down counters and then to reset said up counter;

an output from said second down counter being connected to programmably determine the frequency of clock pulses provided by said third programmable clock pulse divider;

whereby said second counter determines a acceleration of said rotor, and said third counter determines a mask time duration after a commutation switching in accordance with the acceleration determined by said second counter.

9. The circuit of claim 8 wherein said reference voltage is zero.

10. A method for operating a polyphase dc motor, comprising:

determining an acceleration of a rotor of the motor, and adjusting a commutation delay in response to the determined acceleration by provided a look-up table of desired commutation delays of corresponding acceleration values;

retrieving a commutation delay for each acceleration value determined;

operating the motor in accordance with the retrieved commutation delays.

11. The method of claim 10 further comprising adjusting a noise mask in response to the determined acceleration.

12. The method of claim 11 wherein said step of adjusting the noise mask comprises adjusting a commutation noise mask.

13. The method of claim 12 wherein said step of adjusting a commutation noise mask comprises adjusting a duration of a commutation noise mask that prevents detection of a back emf reference voltage crossing for the duration of the commutation noise mask.

14. The method of claim 11 further comprising performing said steps of adjusting a commutation delay and adjusting a noise mask in response to the determined acceleration comprises continuing the above said adjusting steps from motor startup continuously through operation at normal operating speed.

15. The method of claim 10 wherein said step of determining an acceleration of a rotor of the motor comprises determining whether said acceleration is a positive or negative acceleration.

* * * * *